(12) United States Patent
Bonneau, Jr. et al.

(10) Patent No.: US 7,810,718 B2
(45) Date of Patent: Oct. 12, 2010

(54) VARIABLE THICKNESS DATA CARD BODY

(75) Inventors: Walter C. Bonneau, Jr., Escondido, CA (US); Jon D. Macklin, National City, CA (US)

(73) Assignee: Cubic Corporation, San Diego, CA (US)

( * ) Notice: Subject to any disclaimer, the term of this patent is extended or adjusted under 35 U.S.C. 154(b) by 1338 days.

(21) Appl. No.: 11/302,408

(22) Filed: Dec. 12, 2005

(65) Prior Publication Data

US 2006/0255161 A1 Nov. 16, 2006

Related U.S. Application Data

(60) Provisional application No. 60/680,826, filed on May 12, 2005.

(51) Int. Cl.
 *G06K 5/00* (2006.01)
(52) U.S. Cl. ..................................... 235/380
(58) Field of Classification Search ................. 235/380
 See application file for complete search history.

(56) References Cited

U.S. PATENT DOCUMENTS

| | | | |
|---|---|---|---|
| 3,651,312 A | 3/1972 | Barney | |
| 3,896,726 A | 7/1975 | Staats | |
| 4,278,199 A * | 7/1981 | Tanaka | 229/92.8 |
| 4,298,217 A | 11/1981 | Moraw et al. | |
| 4,469,725 A | 9/1984 | Fischer et al. | |
| 4,587,413 A | 5/1986 | Hoppe et al. | |
| 4,589,687 A | 5/1986 | Hannon | |
| 4,711,690 A | 12/1987 | Haghiri-Tehrani | |
| 4,733,061 A | 3/1988 | Hegi | |
| 4,788,102 A | 11/1988 | Koning et al. | |
| 4,995,077 A | 2/1991 | Malinowski | |
| 5,251,937 A | 10/1993 | Ojester | |
| 5,340,968 A * | 8/1994 | Watanabe et al. | 235/380 |

(Continued)

FOREIGN PATENT DOCUMENTS

EP 0515327 A1 11/1992

(Continued)

OTHER PUBLICATIONS

"Card security devices and equipment", from Internet, source: http://www.databac.com/products/cards_and_readers/card_security.html; downloaded on Apr. 11, 2005.

(Continued)

*Primary Examiner*—Seung H Lee
*Assistant Examiner*—Tae Kim
(74) *Attorney, Agent, or Firm*—Townsend and Townsend and Crew LLP

(57) ABSTRACT

According to the invention, a fare card for storing information in a plurality of different ways for use in a transit system is disclosed. The fare card includes a card body that has at least a first region and a second region. The first region is located adjacent to an edge of the card body and has a first thickness. The second region has a second thickness that is different than the first thickness. A first data storage element for storing fare information is included in the first region, and a second data storage element is included in the second region.

18 Claims, 8 Drawing Sheets

U.S. PATENT DOCUMENTS

| | | |
|---|---|---|
| 5,842,722 A | 12/1998 | Carlson |
| 5,888,624 A | 3/1999 | Haghiri et al. |
| 5,932,866 A | 8/1999 | Terada et al. |
| 5,969,951 A | 10/1999 | Fischer et al. |
| 6,161,761 A | 12/2000 | Ghearn et al. |
| 6,162,160 A | 12/2000 | Ohshima |
| 6,179,338 B1 | 1/2001 | Bergmann |
| 6,196,594 B1 | 3/2001 | Keller |
| 6,290,138 B1 * | 9/2001 | Ohno et al. ................ 235/492 |
| 6,832,730 B2 | 12/2004 | Conner et al. |
| 2002/0050527 A1 | 5/2002 | Nishikawa et al. |
| 2003/0035364 A1 | 2/2003 | Choi |
| 2003/0111539 A1 | 6/2003 | Cheung |
| 2003/0132300 A1 | 7/2003 | Dilday et al. |
| 2004/0042323 A1 * | 3/2004 | Moshayedi ................ 365/232 |
| 2004/0089726 A1 | 5/2004 | Yamazaki et al. |

FOREIGN PATENT DOCUMENTS

| | | |
|---|---|---|
| EP | 0903687 A2 | 3/1999 |
| JP | 09-030161 | 2/1997 |
| JP | 11-224043 | 8/1999 |
| JP | 2001-001674 | 1/2001 |
| WO | WO01/18750 A1 | 3/2001 |

OTHER PUBLICATIONS

"600 Series Card Counters", from Internet, source: http://www.spartanics.com/display/products/products_detail.cgi?id_num=, downloaded on Apr. 11, 2005.

* cited by examiner

VARIABLE THICKNESS DATA CARD BODY

CROSS-REFERENCE TO RELATED APPLICATION

This application claims the benefit of and is a non-provisional of U.S. Provisional Application No. 60/680,826, filed on May 12, 2005, which is assigned to the assigner hereof and hereby expressly incorporated by reference in its entirety for all purposes.

BACKGROUND

This disclosure relates in general to cards that store information. More specifically, but not by way of limitation, this disclosure relates to data cards used with card readers, proximity scanners, and/or similar devices.

Passengers may gain entry to transit systems by using fare cards. Over time, transit systems have replaced their fare collection equipment and upgraded their data storage technologies. This has resulted in transition periods where a particular transit system may utilize different fare collection equipment at different points within the system. Different and incompatible fare collection equipment may force passengers to carry multiple fare cards in order to use the transit system.

In addition, an individual transit system may be part of a larger transportation network. To reach their destinations, passengers may need to cross boundaries between transit systems that utilize different types of fare cards. In these situations, passengers may be required to carry multiple fare cards, each intended for use in a different part of the transportation network.

SUMMARY

In one embodiment, the present disclosure provides a fare card for storing information in a plurality of different ways for use in a transit system. The fare card includes a card body that has at least a first region and a second region. The first region is located adjacent to an edge of the card body and has a first thickness. The second region has a second thickness that is different than the first thickness. A first data storage element for storing fare information is included in the first region, and a second data storage element is included in the second region.

In another embodiment, the present disclosure provides a data card for storing information in a plurality of different ways. The data card includes a card body that has at least a first region and a second region. The first region is located adjacent to an edge of the card body and has a first thickness. The second region has a second thickness that is greater than the first thickness. A first data storage element is included in the first region and a second data storage element is included in the second region. In addition, a magnetic loop antenna is disposed in the second region and is coupled to the second data storage element.

In yet another embodiment, the present disclosure provides a data card for storing information in a plurality of different ways. The data card includes a card body that has a width and a length that is greater than the width. The card body also includes at least a first region and a second region. The first region has a width that is at least 15% of the card body width. The first region is located adjacent to an edge of the card body and has a first thickness. The second region has a second thickness that is different than the first thickness. A first data storage element is included in the first region and a second data storage element is included in the second region.

Further areas of applicability of the present invention will become apparent from the detailed description provided hereinafter. It should be understood that the detailed description and specific examples, while indicating various embodiments of the invention, are intended for purposes of illustration only and are not intended to necessarily limit the scope of the invention.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Figure 1A:
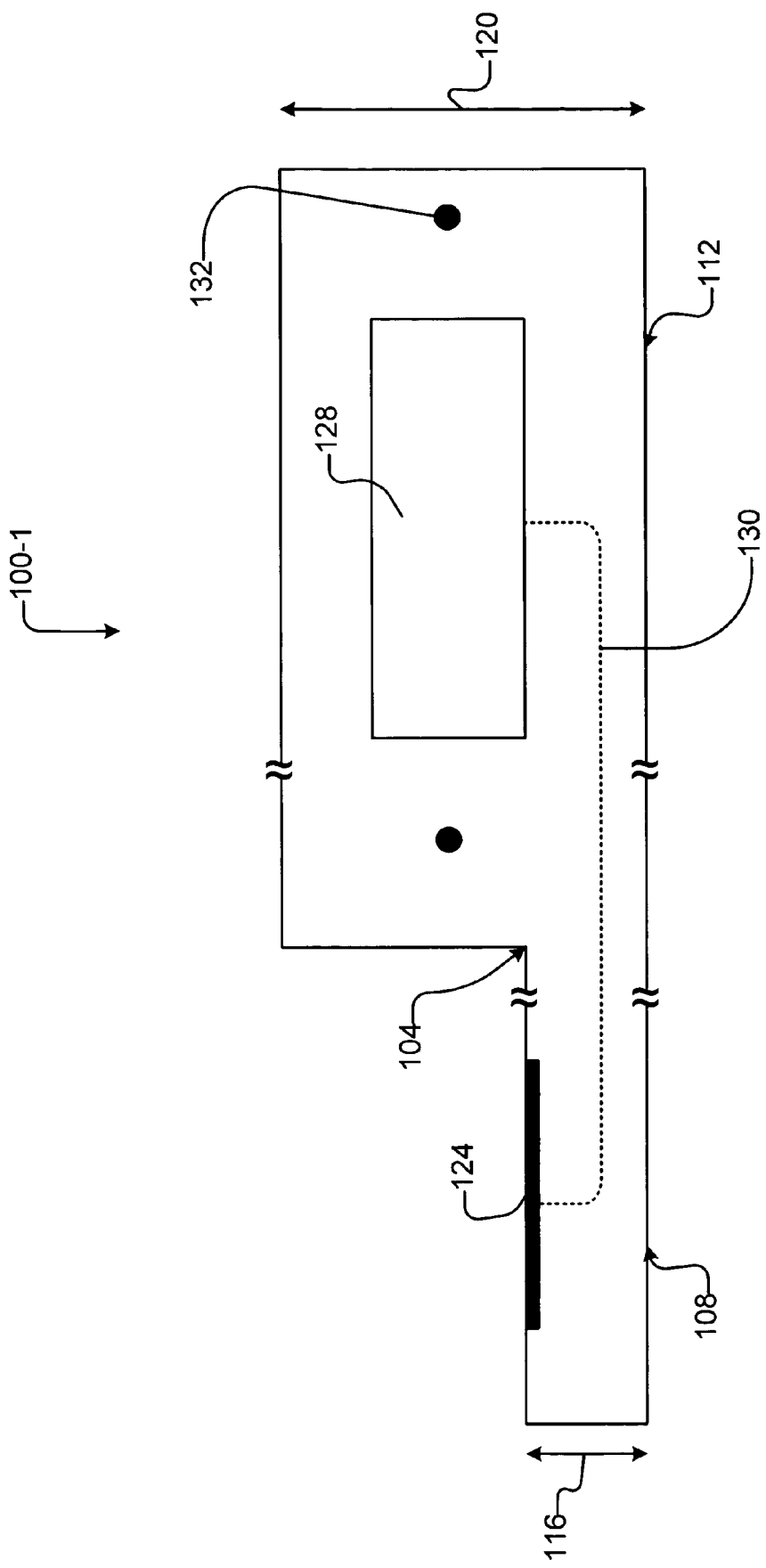
FIG. 1A is a side-sectional view of an embodiment of a data card.

Referring first to FIG. 1A, a side-sectional view of an embodiment of a data card 100-1 is shown. This embodiment of the data card 100-1 comprises a card body 104 that may be formed either from a single piece of material or from two or more layers of material. The material is commonly plastic and/or paper but may include other substances that are durable and capable of holding a shape. In addition, the material may be transparent or opaque as required to display pictures and/or writing.

The card body 104 is intended to be portable and may be approximately the size of a consumer credit card. Other embodiments may be approximately the size of identification cards, fare cards, membership cards, card keys, passports, or stored value cards. Other embodiments could have other configurations and sizes.

In this embodiment, the card body 104 includes a first region 108 and a second region 112. The regions 108, 112 may perform different functions and may be either rigid or flexible depending upon their intended use. In a particular embodiment, for example, the first region 108 might be used with a magnetic stripe card reader/writer. Thus, it might be flexible and specially designed for swiping operations. The second region 112, on the other hand, might be substantially more rigid than the first region 108 in order to protect an integrated circuit and/or an antenna.

Applications of the data card 100-1 have regions 108,112 of particular thicknesses. The thickness may be a physical constraint or may be related to durability and length of service considerations. For example, an ATM machine may only accept cards with a particular thickness. Alternatively, a data card manufacturer may design a card to last for a short period of time. Data cards intended to last for long periods of time may be thicker and more rigid than disposable cards that provide only a few uses. Thus, thickness may be an important consideration in determining whether a data card is suitable for a specific application.

To provide flexibility, regions of the card body 100-1 have different thicknesses. Specifically, the first region 108 has a first thickness 116 and the second region 112 has a second thickness 120. The two thicknesses are generally selected to conform with popular card standards, including ISO 7810 (identity cards) and ISO 15457 (thin flexible cards). Other embodiments of the data card 100, however, may incorporate additional aspects of commercial and international card standards to further enhance data card functionality. Further, some embodiments may not conform to any standard, but are designed to work with proprietary readers. Throughout this specification card reader/writers may be referred to as being a reader or reading equipment, but it is to be understood that the reader may also write to the data card.

In an exemplary embodiment, the first thickness 116 is from about 250 um (10 mils) to about 305 um (12 mils) thick and is designed for use with magnetic thin card reading equipment. The second thickness 120 is approximately 760 um (30 mils) thick and conforms to thickness specifications of ISO 7810, ID-1 format. In other embodiments, the first thickness 116 at its maximum may comprise any whole number between 200 um (8 mils) and 381 um (15 mils) and the second thickness 120 at its maximum may include any whole number between 600 um (25 mils) and 1000 um (40 mils).

Many combinations of the first thickness 116 and the second thickness 120 are possible in various embodiments. These combinations permit card manufacturers and card sellers to target the needs of their customers. Thus, a transit system operator may deploy a data card that allows passengers to swipe the first region 108 of the card body through a turnstile in a subway system and later insert the second region 112 into a vending machine to make purchases, for example. Alternatively, combination data cards might be offered by different businesses or government entities to meet customer demands. For example, a fare card could be paired with an identification card or an RFID toll card. In each case, however, the first thickness 116 and the second thickness 120 enable a single data card 100-1 to be used with a wide range of reader equipment in many different applications.

A first data storage element 124 is included in the first region 108 for interacting with external reader/writer systems. The second region 112 has a second data storage element 128. As shown, the data storage elements may be different. For example, the first data storage element 124 may be a magnetic stripe ("magstripe") and the second data storage element 128 may be an integrated circuit. Other embodiments, however, may include the same type of data storage element in both the first and second regions. The data storage elements may comprise magnetic stripes, optical bar codes, integrated circuits with external contacts, integrated circuits with antenna configurations, and passive or active RFID tags. Integrated circuit storage elements may be further coupled to microprocessors and digital memory circuits to provide additional capabilities.

A magnetic loop antenna 132 enables embodiments of the data card to wirelessly interact with card reading equipment. The magnetic loop antenna 132 may have different lengths and geometric arrangements for particular applications. For example, some embodiments of the data card 100-1 may include a second data storage element 128 that is an active RFID tag. In this case, the RFID tag would be activated by exposing the magnetic loop antenna 132 to electromagnetic radiation from an RFID transceiver. Standard RFID activation frequency ranges include low-frequency (125 or 134.2 KHz), high-frequency (13.56 MHz), UHF (868 to 956 MHz) and microwave (2.45 GHz) in various embodiments. Thus, embodiments of the data card may include a magnetic loop antenna 132 that is specifically designed to receive the wireless communication signals.

Other embodiments of the data card 100-1, for example, might include a second data storage element 128 that is an integrated circuit coupled to a magnetic loop antenna 132. This configuration might provide contact-less smartcard functionality in accordance with ISO 14443 or some other standard. As an example, the card might act as a stored value card that employs data encryption technology for secure wireless transactions with a host system.

In some embodiments, the first data storage element 124 operates independently from the second data storage element 128. Other embodiments, however, may include an electrical connection 130 between the elements that facilitates the exchange of information. For example, an embodiment comprising a first data element 124 that is a magnetic stripe and a second data storage element 128 that is an integrated circuit might also include an electrical connection 130 between the elements such that the integrated circuit could read data from or write data to the magnetic stripe to reprogram it. Where there is the ability to reprogram one data storage elements from the other, both data storage elements could be synchronized. Further embodiments might include a first data storage element 124 that is an integrated circuit coupled to a microprocessor and a second data storage element 128 that is an integrated circuit. An electrical connection 130 might couple the data storage elements such that both could be programmed by the microprocessor.

Figure 1B:
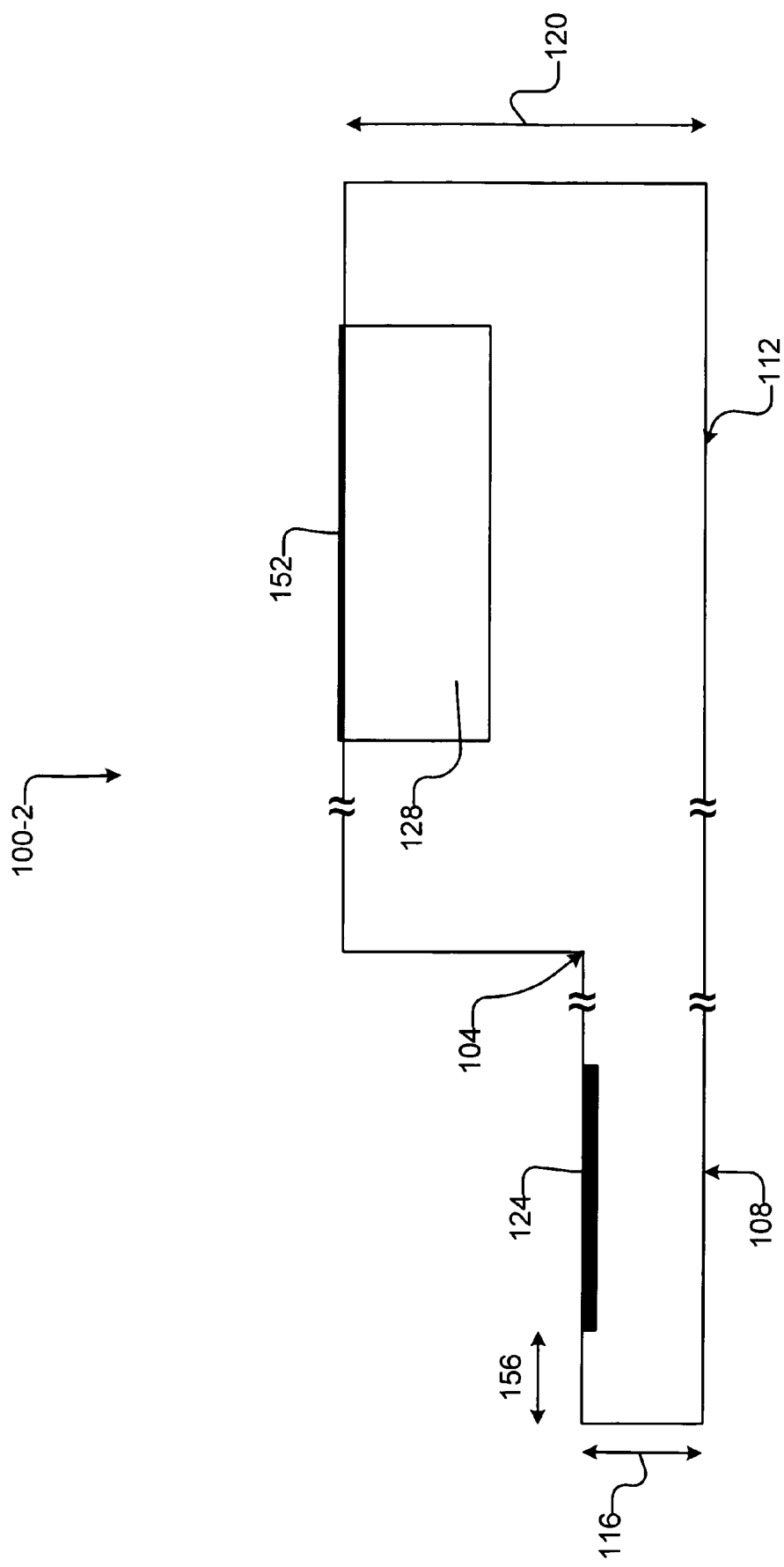
FIG. 1B is a side-sectional view of an embodiment of a data card having surface mounted electrical contacts.

Referring to FIG. 1B, a side-sectional view of an embodiment of a data card 100-2 having surface mounted electrical contacts 152 is shown. This embodiment illustrates a second data storage element 128 that is an integrated circuit. The second data storage element 128 is disposed in the second region 112 of the data card and can be protected by the second thickness 120. The second data storage element 128 can be accessed by a card reader through electrical contacts 152.

This embodiment also shows a first data storage element 124 that is a magnetic stripe 124. The magnetic stripe 124 is located at an offset 156 distance from an edge of the card body. Placement of the first data storage element 124 in relation to an edge of the card body 104 allows proper alignment of the magnetic stripe 124 when the data card is swiped through a card reader/writer. In an exemplary embodiment, the first data storage element 124 is a 9.53 mm (0.375 inch) magstripe and is offset 156 by a distance of about 5.66 mm (0.223 inch) from the edge of the card body 104. Other offsets 156 from the edge of the card body 104 may be selected to accommodate a variety of card reading/writing equipment.

Figure 1C:
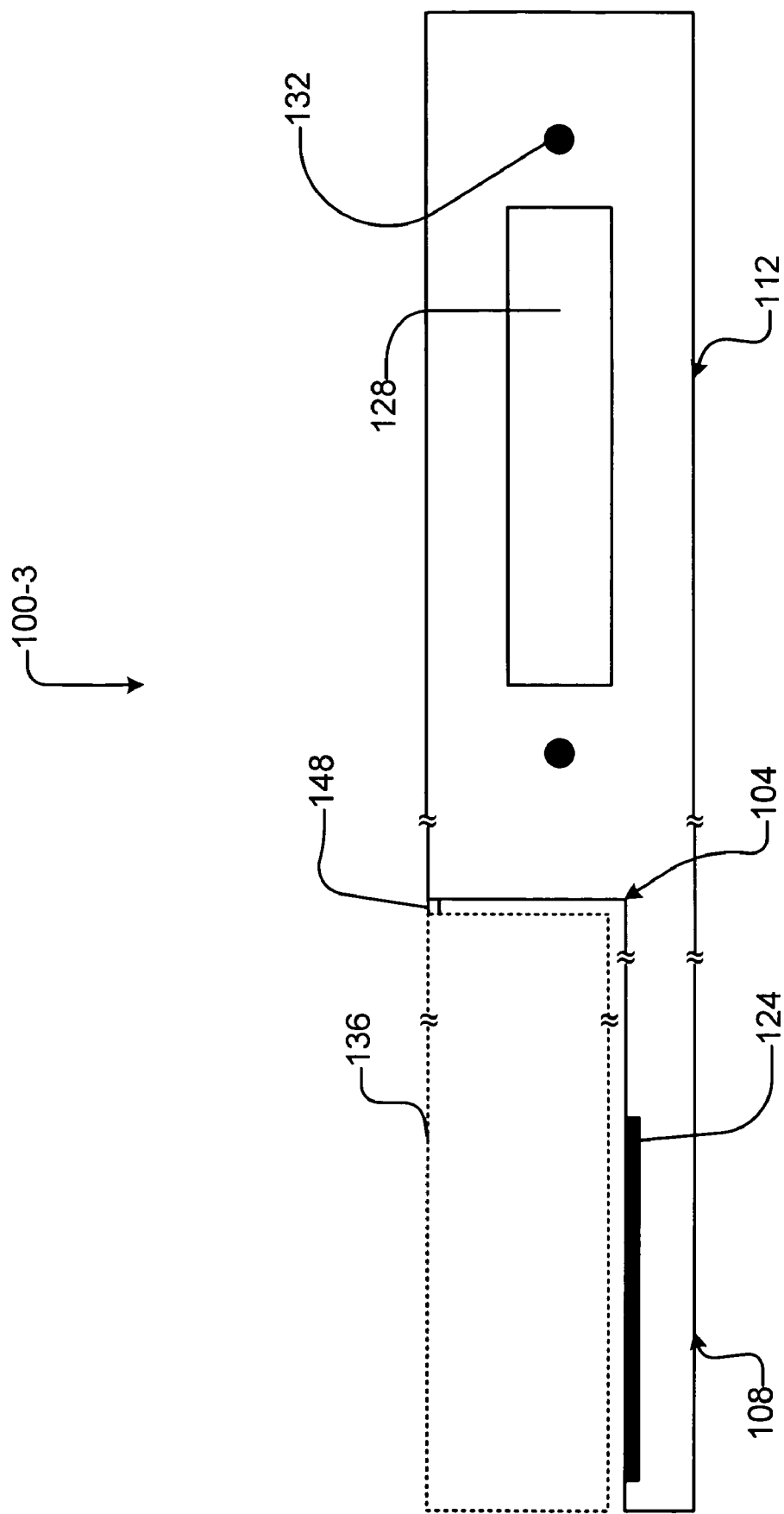
FIG. 1C is a side-sectional view of an embodiment of a data card including a removable cover.

Referring next to FIG. 1C, a side-sectional view of an embodiment of a data card 100-3 with a removable cover 136 is shown. The removable cover 136 connects to the card body 104 with a fastener 148. The fastener 148 may comprise plastic tabs, a perforated seam, an adhesive strip, a snap assembly, or other means of attachment. Depending upon the fastener 148 selected, it may or may not be possible to reattach the removable cover 136 to the card body 104. Thus, some embodiments may include tear-away or break-away covers while other embodiments may have fasteners that permit the cover to remain attached and be flipped-back to its original position. In one embodiment, the fastener allows removal of the cover 136, which can be reattached by snapping the fastener back in place on the card body 104. There may be a non-permanent adhesive on the cover 136 to allow sticking it into place on the card body when the first data storage element 124 is not needed.

The removable cover 136 protects the first data storage element 124 until it is needed. In the embodiment shown, the removable cover 136 also increases the first thickness 116 so that it generally matches the second thickness 120. This results in a uniform thickness throughout the card body 104 and may facilitate manufacturing, distribution and use of the data card in one embodiment. For example, uniform thickness may facilitate use with automated test equipment or dispensing devices such as vending machines.

Figure 1D:
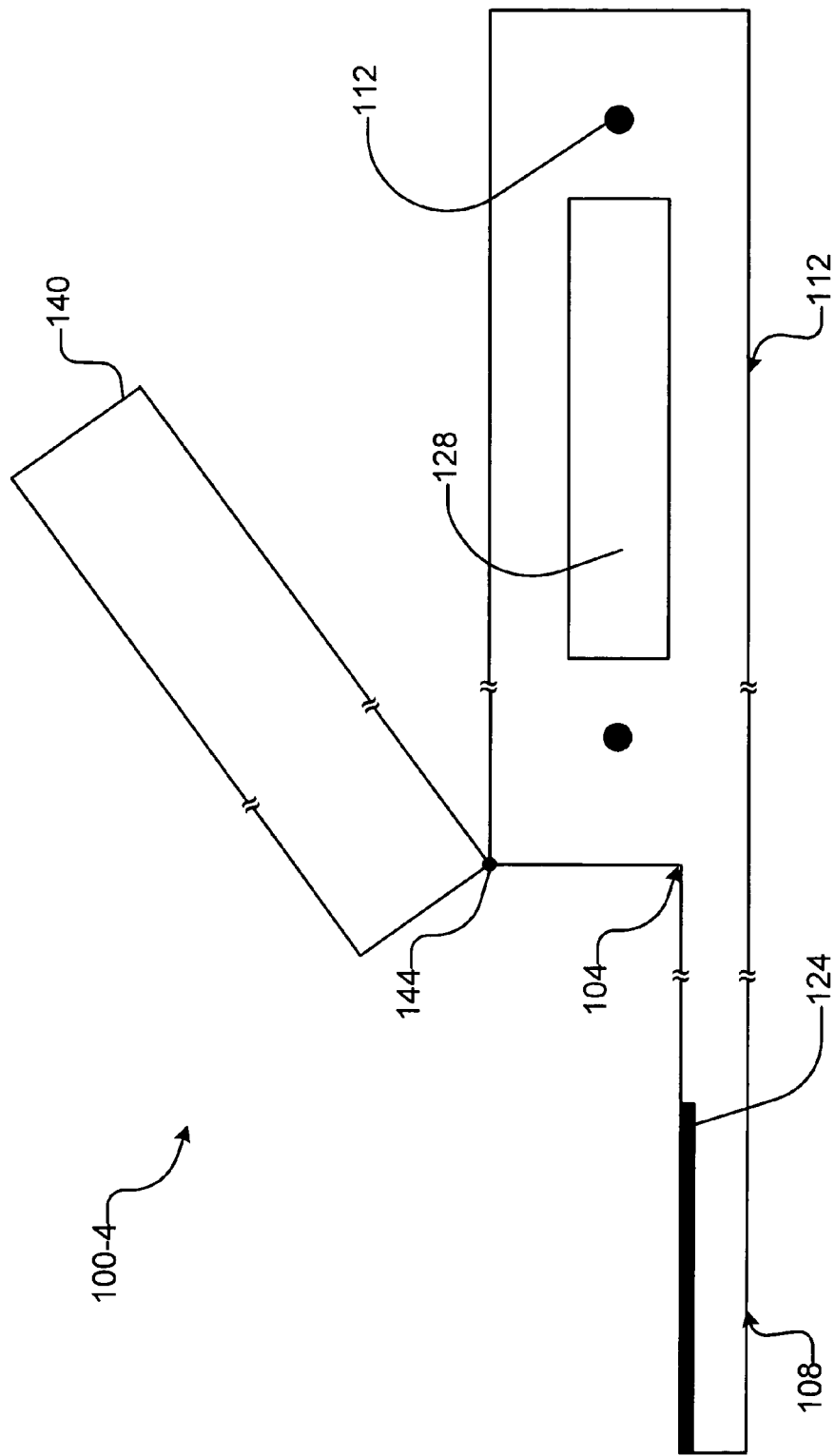
FIG. 1D is a side-sectional view of an embodiment of a data card including a retractable cover.

With reference to FIG. 1D, a side-sectional view of an embodiment of a data card 100-4 with a retractable cover 140 is shown. In this embodiment, the retractable cover 140 rotates about an axis running along an edge of the card body 104. A fastener 144 such as a hinge, pin, or swivel joint attaches the retractable cover 140 to the card body 104. In one embodiment, the fastener 144 is made of the same material as the card body 104, but is thin enough to allow the material to act as a hinge. The retractable cover 140 may be opened to a position that exposes the first data storage 124 element and later closed to cover and protect the first data storage element 124. Adhesive on the retractable cover 140 may allow the cover 140 to remain in the close position without passing adhesive to first region 108.

Figure 2A:
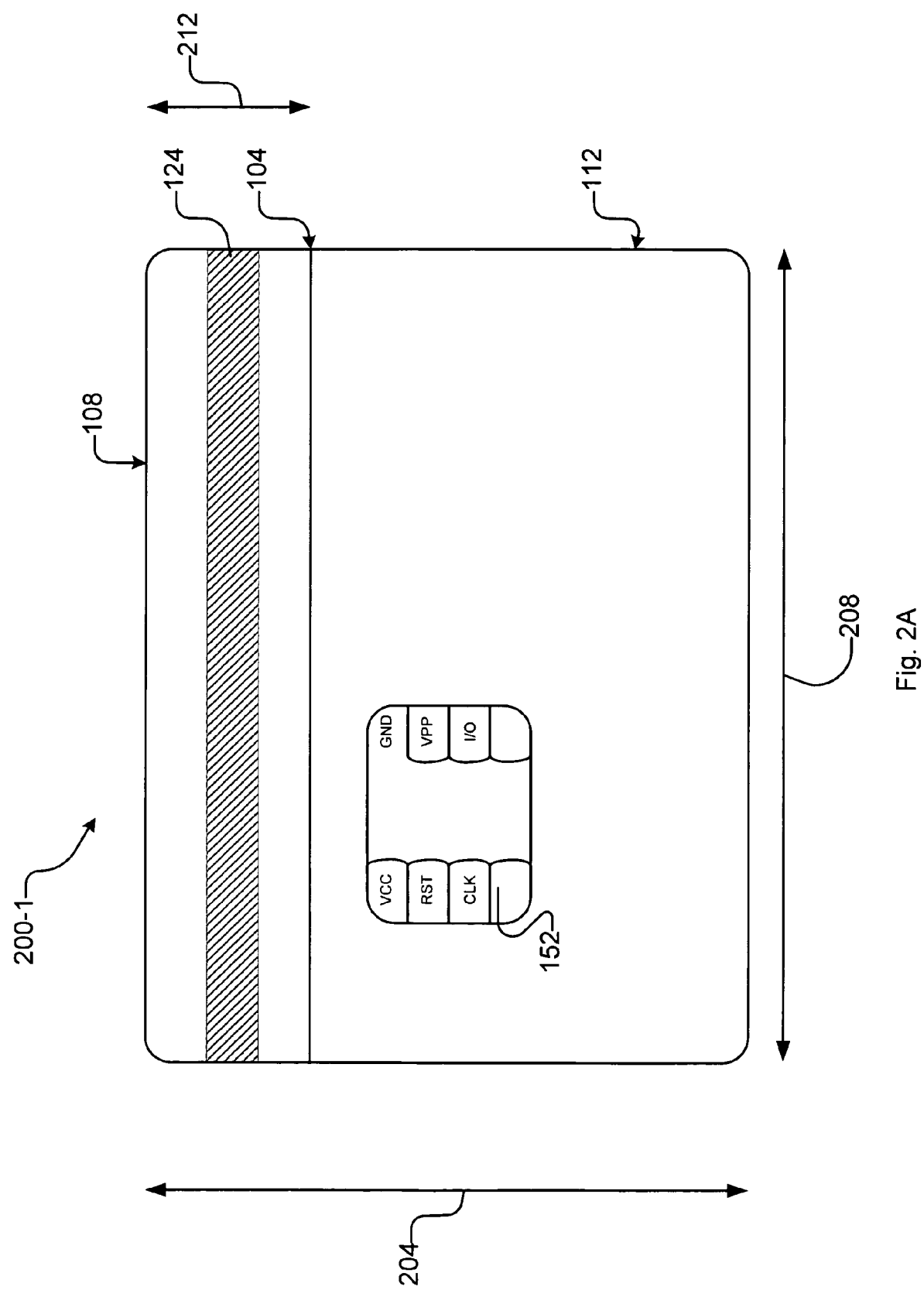
FIGS. 2A-2D are plan views of embodiments of a data card.

Referring to FIG. 2A, a plan view of an embodiment of a data card 200-1 is shown. This embodiment illustrates a card body 104 with length 208 and width 204 dimensions where the length dimension is greater than the width dimension. In an exemplary embodiment, the length 208 and the width 204 conform to the ID-1 format of ISO 7810. Thus, the length 208 is approximately 86 mm (3.39 inches) and the width 204 is approximately 54 mm (2.13 inches), for example. Other data card embodiments, however, may be directed to different standards or different data card applications. Thus, the length 208 and width 204 dimensions of the card body 104 may be varied to meet different card requirements.

The present embodiment includes electrical contacts 152 mounted on the surface of the card body 104 that connect to a second data storage element located directly below the electrical contacts 152. In other embodiments, the data storage element is not directly below the electrical contacts 152, but the data storage element is electrically coupled to the electrical contacts 152. The electrical contacts 152 enable a card reader to access data stored by the second data storage element. In an exemplary embodiment, the layout of the electrical contacts 152 and their position on the data card 104 conform to the ISO 7816 standard describing contact smart cards. Other embodiments, however, may use customized electrical contacts 152 that may be attached at custom locations on the data card.

A first region width 212 is also shown in the present embodiment. The first region width 212 may vary with respect to the card body width 204 and assume different percentages of the card body width 204. In an exemplary embodiment, the first region width 212 may be approximately 33% of the card body width 204. However, as used in different applications, the maximum first region width 212 may be any whole percentage from 15% to 41% of the card body width 204.

Figure 2B:
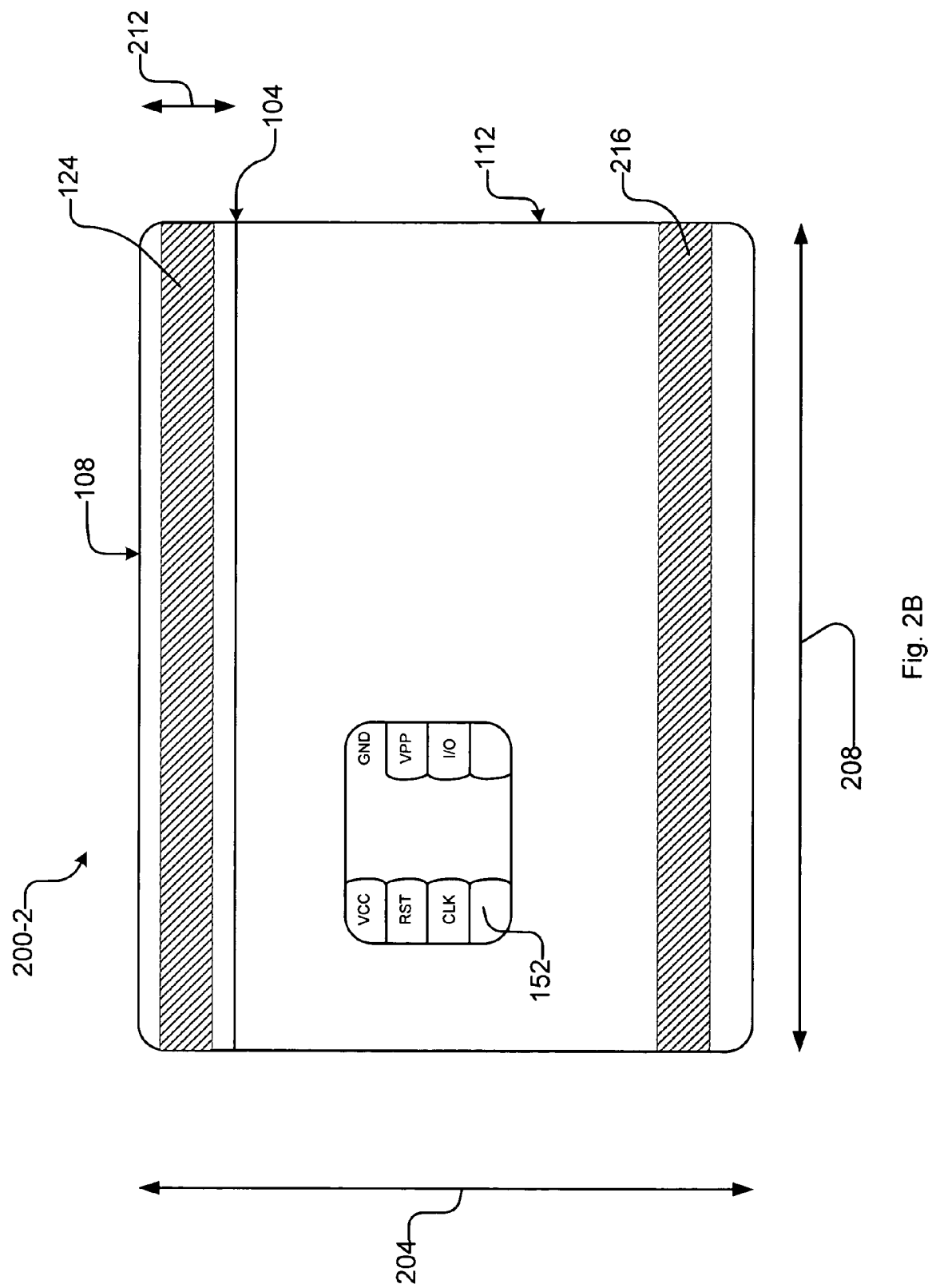

Referring to FIG. 2B, a plan view of an alternative embodiment of a data card 200-2 is shown. In this embodiment, a third data storage element 216 has been added to the second region 112. This configuration further enhances the functionality of the data card. For example, a data card in the present embodiment might include a first region 108 serving as a magnetic thin card and a second region 112 that acts both as a standard magnetic stripe credit card and as a contact smartcard.

Figure 2C:
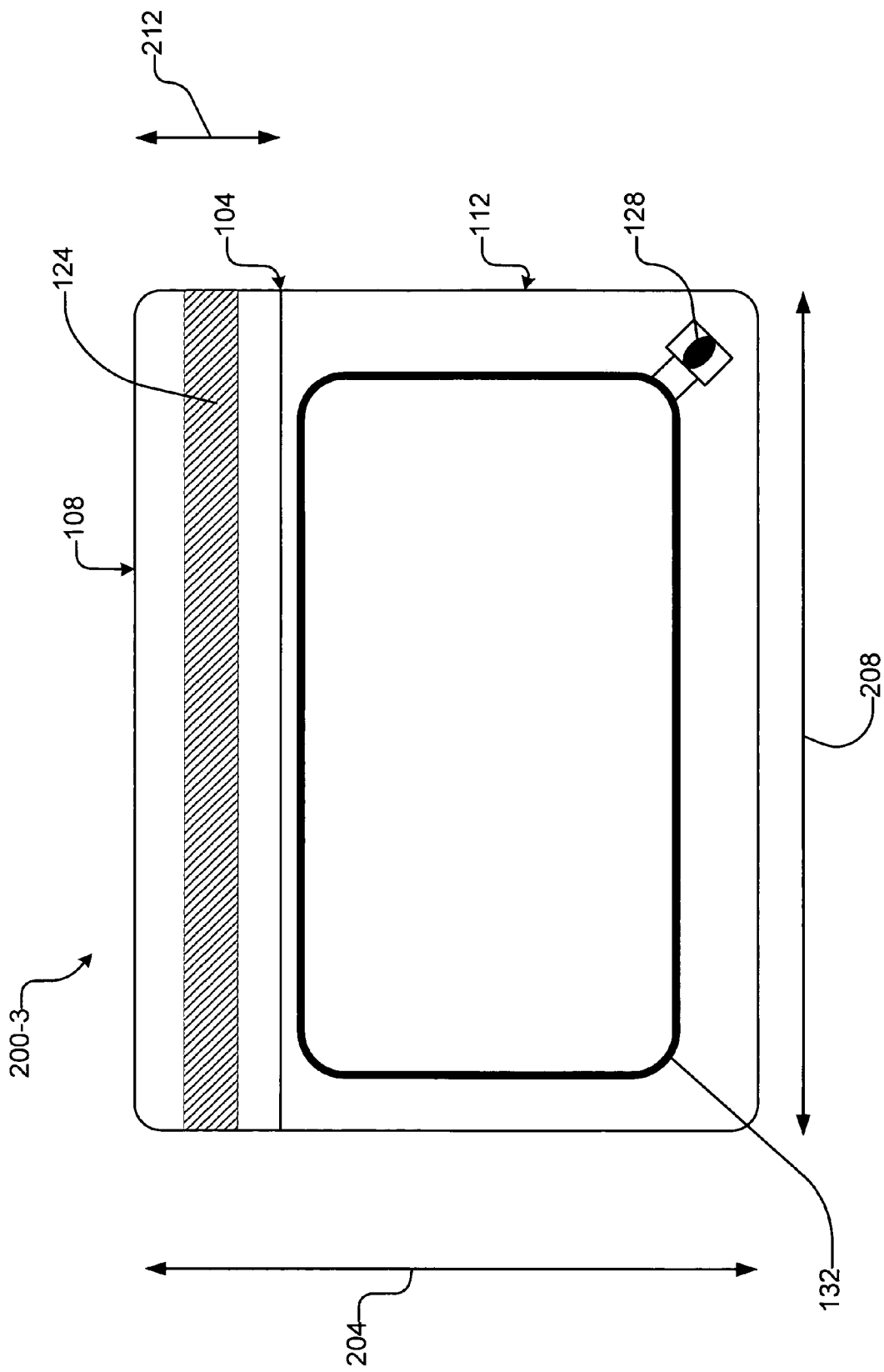

With reference to FIG. 2C, a plan view of a further embodiment of a data card 200-3 is shown. In this embodiment, the first region 108 comprises a first data storage element 124 that is a magnetic stripe. The second region 112 includes a second data storage element 128 that is an integrated circuit coupled to a magnetic loop antenna 132. The magnetic loop antenna 132 is fully contained within the second region 112 and may vary in length and geometry based upon its intended application. For example, this configuration might permit transit passengers to pass between different fare collection systems in a transit network or to pass through different segments of a transit system.

Figure 2D:
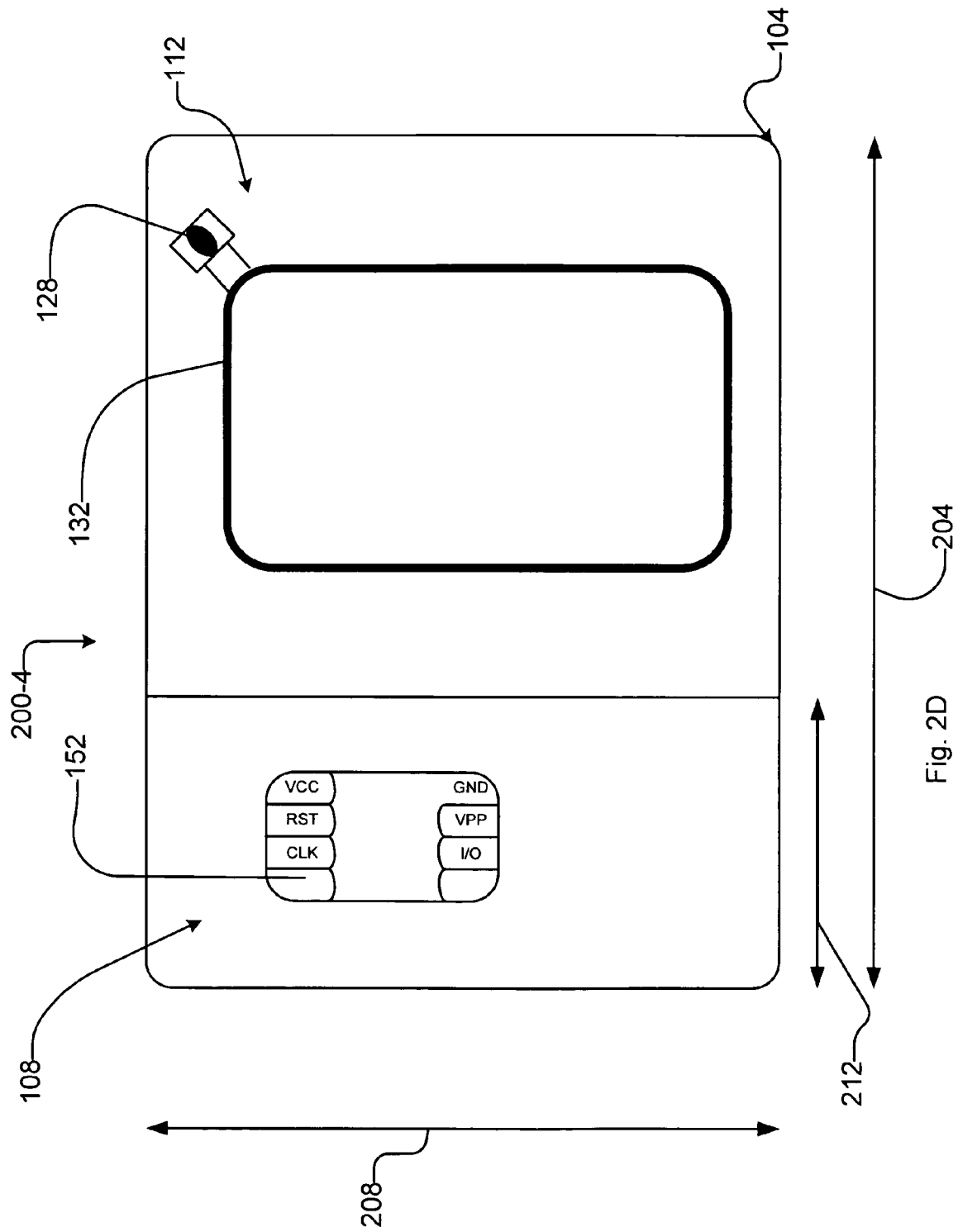

Referring to FIG. 2D, a plan view of an additional embodiment of a data card is shown. This embodiment illustrates surface mounted electrical contacts 152 that attach below to a first data storage element. A second data storage element 128 that is an integrated circuit coupled to a magnetic loop antenna 132 is also shown. This embodiment may represent a customized application intended for use during a transition period, for example. An electrical conductor may be included for synchronizing the two data storage elements or otherwise sharing information between them. Other embodiments may not couple together the data storage elements.

While the principles of the disclosure have been described above in connection with specific apparatuses and methods, it is to be clearly understood that this description is made only by way of example and not as limitation on the scope of the invention.

What is claimed is:

1. A data card for storing information in a plurality of different ways, the data card comprising:
   a card body, wherein:
      the card body has at least a first region and a second region,
      the first region is adjacent to an edge of the card body,
      the first region has a first thickness, and
      the second region has a second thickness that is greater than the first thickness;
   a first data storage element in the first region;
   a second data storage element in the second region;
   a magnetic loop antenna, wherein:
      the magnetic loop antenna is disposed within the second region, and
      the magnetic loop antenna is coupled to the second data storage element; and
   a movable cover, wherein:
      the movable cover is coupled with the card body,
      the movable cover is configured to protect the first data storage element when the movable cover is in a first state,
      the movable cover is configured to be altered to a second state, wherein the first data storage element is exposed when the movable cover is in the second state, and the movable cover comprises a third thickness, wherein the third thickness and the first thickness combine to match the second thickness.

2. The data card for storing information in a plurality of different ways as recited in claim 1, wherein the card body further comprises a width and a length that is greater than the width, and the first region has a width that is at least 15% of the card body width.

3. The data card for storing information in a plurality of different ways as recited in claim 1, wherein the first thickness is less than 15 mils.

4. The data card for storing information in a plurality of different ways as recited in claim 1, wherein the second thickness is at least 30 mils.

5. The data card for storing information in a plurality of different ways as recited in claim 1, wherein the first data storage element and the second storage element are each selected from the group consisting of optical bar codes, magnetic stripes, integrated circuits, passive RFID tags, and active RFID tags.

6. The data card for storing information in a plurality of different ways as recited in claim 1, further comprising a connection between the first data storage element and the second data storage element configured to enable one of the data storage elements to read data from and write data to the other data storage element.

7. The data card for storing information in a plurality of different ways as recited in claim 1, wherein the movable cover is detachably coupled with the card body.

8. The data card for storing information in a plurality of different ways as recited in claim 7, wherein the movable cover is configured to be reattached with the card body subsequent to being detached.

9. The data card for storing information in a plurality of different ways as recited in claim 1, wherein the movable cover is a retractable cover.

10. The data card for storing information in a plurality of different ways as recited in claim 9, wherein the retractable cover comprises at least one of a hinge, a pin, or a swivel joint.

11. A data card for storing information in a plurality of different ways, the data card comprising:
    a card body comprising:
        a width and a length that is greater than the width,
        at least a first region and a second region, wherein:
            the first region is adjacent to an edge of the card body,
            the first region has a width that is at least 15% of the card body width,
            the first region has a first thickness that is less than 15 mils, and
            the second region has a second thickness that is at least 30 mils;
    a first data storage element in the first region;
    a second data storage element in the second region; and
    a movable cover, wherein:
        the movable cover is coupled with the card body,
        the movable cover is configured to protect the first data storage element when the movable cover is in a first state,
        the movable cover is configured to be altered to a second state, wherein the first data storage element is exposed when the movable cover is in the second state, and
        the movable cover comprises a third thickness, wherein the third thickness and the first thickness combine to match the second thickness.

12. The data card for storing information in a plurality of different ways as recited in claim 11, further comprising a magnetic loop antenna disposed within the second region and coupled to the second data storage element.

13. The data card for storing information in a plurality of different ways as recited in claim 11, further comprising a connection between the first data storage element and the second data storage element configured to enable one of the data storage elements to read data from and write data to the other data storage element.

14. The data card for storing information in a plurality of different ways as recited in claim 11, wherein the first data storage element and the second storage element are each selected from the group consisting of optical bar codes, magnetic stripes, integrated circuits, passive RFID tags, and active RFID tags.

15. The data card for storing information in a plurality of different ways as recited in claim 11, wherein the movable cover is detachably coupled with the card body.

16. The data card for storing information in a plurality of different ways as recited in claim 15, wherein the movable cover is configured to be reattached with the card body subsequent to being detached.

17. The data card for storing information in a plurality of different ways as recited in claim 11, wherein the movable cover is a retractable cover.

18. The data card for storing information in a plurality of different ways as recited in claim 17, wherein the retractable cover comprises at least one of a hinge, a pin, or a swivel joint.

* * * * *